United States Patent Office 3,192,158
Patented June 29, 1965

3,192,158
LUBRICATING COMPOSITIONS CONTAINING A DETERGENT COPOLYMER AND AN ALKALINE EARTH PETROLEUM SULFONATE-TRIALKYL AMINE COMPLEX
Roland F. Bergstrom, Martinez, and Richard C. Nelson, Walnut Creek, Calif., assignors to Shell Oil Company, New York, N.Y., a corporation of Delaware
No Drawing. Filed Apr. 18, 1962, Ser. No. 188,535
10 Claims. (Cl. 252—33.4)

This invention relates to lubricating oil compositions which are highly detergent and also wear and sludge resistant.

It is known that non-ash forming nitrogen-containing polymers such as commercially available copolymers of long-chain alkyl acrylates and a polymerizable compound containing a basic amino group or amido group such as Du Pont's LOA 564 or 565 or Rohm and Haas' Acryloid 917 or 966 which are copolymers of long-chain alkyl methacrylates and aminoalkylmethacrylate or vinyl pyrrolidone, respectively, possess good detergent properties, but in lubricating oil compositions subjected to wide temperature and pressure conditions, they lack wear resistant properties and in the presence of metal salts such as metal sulfonates they tend to complex and form sludge. Attempts to improve these polymers by modifying their structure or by means of secondary additives has not been too successful.

It has now been discovered that certain non-ash nitrogen-containing detergent polymers can be rendered sludge and wear resistant by addition to lubricating oils containing such non-ash forming detergent polymers a small amount of an oil-soluble complex of a tertiary alkyl amine containing at least one $C_{6-20}$ alkyl radical and an oil-soluble basic alkaline earth metal petroleum sulfonate represented by the formula $[(R)_3N \cdot HO-M-O_3SX]$ (I) where R's are alkyl radicals, at least one of which contains 6 or more carbon atoms in the alkyl chain, and the other R's may be $C_{1-4}$ alkyl radicals; M is an alkaline earth metal such as calcium, barium or magnesium, preferably calcium, and X is the petroleum residue from which the sulfonate is prepared which is generally an aromatic mineral oil having a viscosity in the range of 40 to 450 SUS at 100° F. By certain nitrogen-containing detergent polymer is meant one selected from the group consisting of (A) copolymers of long-chain alkyl acrylates and vinyl pyridine and (B) copolymers of long-chain alkylate acrylates and vinyl pyrrolidone. The addition of a small amount (0.1% to 5%) of complex as defined to lubricating oils containing a small amount (0.5% to 10%) of detergent polymers (A) and/or (B) produces unexpected results in that such compositions possess excellent detergent properties and are sludge and wear resistant.

The polymers of group (A) having a molecular weight range of 100,000 to over 1,000,000, preferably between 200,000 and 800,000, can be prepared by the methods described in British patent specification 760,544 and U.S. Patents 2,839,512 and 2,889,282 and include: copolymer of stearyl methacrylate and 2-methyl-5-vinyl pyridine; copolymer of stearyl methacrylate, lauryl methacrylate and 2-methyl-5-vinyl pyridine; and those which contain additional $C_{1-4}$ alkyl methacrylates in the polymer, such as copolymers of stearyl methacrylate, lauryl methacrylate, methyl methacrylate and 2-methyl-5-vinyl pyridine; and similar copolymers in which the methyl methacrylate is replaced by butyl methacrylate and the 2-methyl-5-vinyl pyridine is replaced by 5-ethyl-2-vinyl pyridine; or the copolymers of group (B), namely N-vinyl pyrrolidone and alkyl acrylates which can be prepared by methods described in Belgian Patent 550,442 and British Patent 808,664. Vinyl pyrrolidone acrylate copolymers are sold by Rohm and Haas under the designations Acryloid 315X or 917 or 966 and are copolymers of N-vinyl pyrrolidone and lauryl methacrylate of varying molecular weights, preferably in the range of 200,000 to 800,000 molecular weight.

Particularly preferred detergent polymers are the copolymers of vinyl pyridine or vinyl pyrrolidones (vinyl lactams) and methacrylates or mixtures of dissimilar methacrylate esters, the preparation of which is illustrated by the following examples.

EXAMPLE I

A mixture of 25% of 2-methyl-5-vinyl pyridine and 75% stearyl methacrylate were heated in a 50–50 mixture of benzene and a light mineral oil (East Texas 100 SUS at 100° F. neutral) to about 120° C. at which time 0.25% wt. of ditert-butyl peroxide was added and the reaction mixture was maintained at this temperature for about 6 hours.

At the completion of the reaction, the solvent was stripped off and the polymer diluted with neutral oil to a polymer content of about 30% by weight and filtered at 100–120° C. The copolymer had a molecular weight of about 200,000 and a nitrogen content of 2.94%.

EXAMPLE II

30% stearyl methacrylate, 51% lauryl methacrylate, 14% methyl methacrylate and 5.0% 2-methyl-5-vinyl pyridine were charged to a 300-gallon stainless steel autoclave. A 50–50 mixture of benzene and neutral petroleum oil was then added to the autoclave so as to furnish 1 part of the mixture per 3 parts of the total monomer. 0.25% of ditert-butyl peroxide was then added and the mixture heated at 120° C. for about 7 hours.

At the completion of the reaction, the benzene was stripped off to final conditions of 120° C. and 10 mm. Hg with nitrogen purging. The benzene-free product was then diluted with neutral oil to a polymer content of about 30% by weight and filtered at 100–120° C. The polymer had a molecular weight of about 600,000 and a nitrogen content of 0.54%.

Other representative copolymers useful in lubricating compositions of this invention include those identified below in which the monomeric units are present in the mol ratios of 1:1, 1:2, 1:4, 1:6, 1:8, 1:10 and 1:20, of the monomer containing the oleophilic unit to the amino nitrogen-containing polymerizable material, respectively, said copolymers having a molecular weight in excess of 50,000: lauryl methacrylate/styrene/2-methyl-5-vinyl pyridine, lauryl methacrylate/styrene/2-methyl-5-octyl methacrylate/N-vinyl pyrrolidone, N-vinyl pyrrolidone/octyl methacrylate, N-vinyl-3-methyl pyrrolidone/cetyl methacrylate, N-vinyl pyrrolidone/stearyl methacrylate, N-vinyl pyrrolidone/stearyl acrylate, N-vinyl-3,3-dimethyl pyrrolidone/lauryl methacrylate, N-vinyl pyrrolidone stearyl methacrylate/cetyl methacrylate, N-vinyl-3-methyl pyrrolidone/stearyl methacrylate/lauryl methacrylate and mixtures thereof.

The sulfonates used for complexing with tertiary alkyl-amine are basic polyvalent metal petroleum sulfonates, of which petroleum sulfonates of the metals of Group II of the Periodic Table having an atomic number of from 12 to 56, inclusive, are preferred, and especially of the alkaline earth metals. Suitable sulfonates include oil-soluble basic calcium, barium and magnesium petroleum sulfonates. The acid portion of the salt can range in molecular weight from about 350 to 550, and preferably are in the range of from 400 to 500.

The tertiary alkylamines used in complexing with the basic metal sulfonate can be represented by the formula $R_3N$ where the R's are the same or different alkyl radicals, one of which is at least 6 carbon atoms. Such amines include trihexylamine, trioctylamine, tritetradecylamine, trihexadecylamine, trioctadecylamine, dimethylhexylamine, dimethyloctylamine, dimethylhexadecylamine, dimethyloctadecylamine and the like.

Complexing of the amines and basic metal petroleum sulfonate can take place at reaction temperatures of from 50 to 220° F., preferably between 100° F. and 150° F., and if desired in a neutral solvent such as a liquid hydrocarbon, e.g. benzene, toluene, pentenes, hexenes, light naphtha, etc. The complex can also be made in situ in base mineral oil under reaction temperature noted above.

Complexes of the tertiary alkylamine-basic petroleum sulfonate type include (1) complex of basic calcium petroleum sulfonate (180% basic)–dimethyloctadecylamine, (2) complex of basic calcium petroleum sulfonate (180% basic)–dimethylhexadecylamine, (3) complex of basic calcium petroleum sulfonate (800% basic)–dimethyloctadecylamine, (4) complex of basic calcium petroleum sulfonate (180% basic)–trioctylamine, (5) complex of basic barium petroleum sulfonate (180% basic)–dimethyloctadecylamine, (6) complex of basic magnesium petroleum sulfonate (180% basic)–dimethyloctadecylamine, (7) complex of basic barium petroleum sulfonate (800% basic)–dimethyloctadecylamine, (8) complex of basic barium petroleum sulfonate (180% basic)–trioctylamine, (9) complex of basic magnesium petroleum sulfonate (180% basic)–trioctylamine and (10) complex of basic calcium petroleum sulfonate (180% basic)–trioctadecylamine.

The complexes of (1) to (10) were formed by admixing the reactants at temperatures between 100° F. and 150° F. in toluene solvent for about 2 to 4 hours, and thereafter removing the solvent and adding the complex in desired concentration (0.1–5%) to a base mineral oil.

To compositions of this invention can be added auxiliary additives of which organic compounds containing inorganic phosphorus acidic radicals with $P_2O_5$, $P_2S_5$, salts of said products obtained by neutralizing the reaction products mentioned with oxides, hydroxides, carbonates, or halides of alkali, mono- or polyvalent metals such as the alkali, alkaline earth or heavy metals exemplified by Na, K, Ca, Ba, Sr, Mg, Al, Co, Cd, Pb, Ni and Fe, to form the corresponding salts and mixtures thereof. Compounds of this type include salts such as Na, Ca, Ba, Zn and Al salts of alkyl, alkaryl, aralkyl, cycloalkyl, aryl phosphates, thiophosphates, and specifically illustrated by Na, K, Ca, Ba, Zn and Al methylcyclohexyl phosphate, dimethylcyclohexyl dithiophosphate, dihexyl acid thiophosphate, lauryl benzyl thiophosphate, butyl trichloromethane phosphonate; $P_2S_5$-olefin reaction product as described in U.S. Patents 2,316,080, 2,316,082, 2,316,086, 2,261,047, 2,540,084, 2,358,305, 2,466,408, 2,344,393, 2,493,217 and 2,662,856 as well as the non-salt or non-neutralized products such as $P_2S_5$-terpene reaction products and mixtures thereof. Compounds of this type are available commercially under the trade names of Lubri-Zol 1095 or 1060 (Lubri-Zol Corporation); Oronite 265 or 260 (Oronite Chemical Company); Aerolube 70 (American Cyanamid Company); Stan-Add 48 (Standard Oil Company of Indiana) and Santolube 394–C (Monsanto Chemical Company). Other phosphorus compounds which can be used are of the type described by Smalheer et al. in Petroleum Processing, December 1952. A particularly preferred list of such compounds includes the Zn and Ba salts of alkyl dithiophosphate, Na, K, and Ba salts of $P_2S_5$-polybutene reaction products and/or $P_2S_5$-terpene (pinene) reaction products, said products being commercially available from Lubri-Zol Corporation, Standard Oil Company of Indiana and Monsanto Chemical Company, respectively, under the trade names of Lubri-Zol 1095 and Lubri-Zol 1060; Stan-Add 47, 48 and L–9103.

Lubricating oils for additives of this invention can be any natural or synthetic material having lubricating properties. Thus the base may be a hydrocarbon oil of wide viscosity range, e.g. 100 SUS at 100° F. to 150 SUS at 210° F. The hydrocarbon oils may be blended with fixed oils such as castor oil, lard oil and the like, and/or with synthetic lubricants such as polymerized olefins, copolymers of alkylene glycols and oxides; organic esters of poly-basic organic and inorganic acids, e.g. di-2-ethylhexyl sebacate, dioctyl phthalate, trioctyl phosphate; polymeric tetrahydrofuran; polyalkyl silicone polymers, e.g. dimethyl silicone polymer, and the like. If desired, the synthetic lubricants may be used as the sole base lubricant or admixed with fixed oils and their derivatives.

Mineral lubricating oils which are particularly desirable for use in compositions of this invention and which have been used as a base for the compositions of this invention were obtained from West Texas Ellenburger crudes, East Texas crudes, Oklahoma crudes, California crudes. A useful refined oil therefrom had the following properties:

Gravity, ° API _____ Min. 26.5
Pour Point, ° F. _____ Max. 10
Flash, COC, ° F. _____ Min. 390
Viscosity, SUS at 100° F. _____ 120–160
Viscosity index _____ Min. 95

Another such oil is an SAE 30 mineral oil having the following properties:

Gravity, ° API _____ Min. 24.5
Pour Point, ° F. _____ Max. −5
Flash, COC, ° F. _____ Min. 415
Viscosity, SUS at 210° F. _____ 58–63
Viscosity index _____ 50–60

The general formulations of compositions of this invention can be represented by:

| Components | Broad range, percent wt. | Limited range percent wt. |
|---|---|---|
| Primary additives: | | |
| 1 Non-ash forming nitrogen containing polymeric detergent | 0.5–10 | 1–6 |
| 2 Complex of basic polyvalent metal petroleum sulfonate-tertiary alkylamine | 0.1–10 | 0.5–5 |
| Optional additives: | | |
| Anti-oxidants and/or corrosion inhibitors, e.g. metal organo thiophosphate, metal organo thiocarbamates | 0.1–2 | 0.2–1 |
| Base oil (mineral and/or synthetic) | Balance | Balance. |

Preferred compositions of this invention are illustrated by the following compositions.

Composition A:                                                     Percent
   Copolymer of lauryl methacrylate/2-methyl-
      5-vinyl pyridine (4:1) _____ 5
   Basic calcium petroleum sulfonate-dimethyl-
      octadecylamine complex (1) _____ 1.5
   Zn dithiophosphate of isobutylmethyl-carbinol
      and isopropanol _____ 0.8
   Mineral lubricating oil (SAE 10) _____ Balance Composition B:                                                     Percent
   Copolymer of lauryl metharcylate/stearyl
      methacrylate/methyl methacrylate/2-meth-
      yl-5-vinyl pyridine (4:1) _____ 5
   Basic calcium petroleum sulfonate-dimethyl-
      octadecylamine complex (1) _____ 1.5
   Zn dithiophosphate of isobutylmethyl-carbinol
      and isopropanol _____ 0.8
   Mineral lubricating oil _____ Balance Composition C:                                                     Percent
   Copolymer of lauryl methacrylate/stearyl
      methacrylate/2-methyl-5- vinyl pyridine _ 5
   Basic calcium petroleum sulfonate-dimethyl-
      octadecylamine complex (1) _____ 1.5

| | Percent |
|---|---|
| Zn dithiophosphate of isobutylmethyl-carbinol and isopropanol | 0.8 |
| Mineral lubricating oil | Balance |

Composition D:

| | Percent |
|---|---|
| Copolymer of lauryl methacrylate/stearyl methacrylate/2-methyl-5-vinyl pyridine | 5 |
| Basic calcium petroleum sulfonate-dimethylhexadecylamine complex (2) | 1.25 |
| Zn dihexyl dithiophosphate | 0.8 |
| Mineral lubricating oil | Balance |

Composition E:

| | Percent |
|---|---|
| Copolymer of lauryl methacrylate/stearyl methacrylate/2-methyl-5-vinyl pyridine | 4 |
| Basic calcium petroleum sulfonate-trioctadecylamine complex (10) | 2 |
| Mineral lubricating oil | Balance |

Composition F:

| | Percent |
|---|---|
| Copolymer of lauryl methacrylate/N-vinyl pyrrolidone methacrylate (90:10) | 5 |
| Basic barium petroleum sulfonate-dimethyloctadecylamine complex (1) | 2 |
| Zn dithiophosphate of isobutylmethyl-carbinol and isopropanol | 0.8 |
| Mineral lubricating oil (SAE 30) | Balance |

Composition G:

| | Percent |
|---|---|
| Copolymer of lauryl methacrylate/N-vinyl pyrrolidone | 5 |
| Basic calcium petroleum sulfonate-dimethyloctadecylamine complex (1) | 1.2 |
| Mineral lubricating oil (SAE 30) | Balance |

Compositions shown in Table I were tested in a Chevrolet engine under L-4 engine condition (3150 r.p.m., 22.5 B.H.P., jacket temperature 200° F., oil temperature 280° F. for 36 hours), as well as under EX-3 engine conditions and the superiority of compositions of the present invention to others shown in Table I is clearly evidenced.

*Table I*

| Composition | L-4 engine test (bearing wt. loss) | EX-3 final rating (100=perfect) |
|---|---|---|
| Composition C | 70 | 75 |
| Composition F | 73 | 84 |
| (1) Mineral oil (SAE 30)+5% copolymer of lauryl methacrylate/2-methyl-5-vinyl pyridine | 6,240 | 72 |
| (2) Mineral oil (SAE 30)+2% basic Ca petroleum sulfonate | 1,330 | 60 |
| (3) Mineral oil (SAE 30)+5% copolymer of lauryl methacrylate/2-methyl-5-vinyl pyridine+0.2%dimethyloctadecylamine | 450 | 70 |
| (4) Mineral oil (SAE 30)+5% N-vinyl pyrrolidone/lauryl methacrylate | 6,200 | 72 |

Compositions A, C and F of the present invention also passed the Caterpillar L-1 test and the FL-2 engine test. In both tests the engines were clean and in excellent condition at the end of the test, whereas Compositions 1-4 failed to pass these tests. Also, Compositions A, C and F of the present invention in a 30,000 mile field test using Ford, Chevrolet and Plymouth cars resulted in engines which were in excellent condition and were free of varnish, sludge and other undesirable deposits.

Compositions of this invention can be used in engine oils, turbine oils, gear oils and various other fields of lubrication.

We claim as our invention:

1. A lubricating oil composition comprising a major amount of lubricating oil and from about 0.5 to 10% by weight of (A) an oil-soluble nitrogen-containing detergent polymer selected from the group consisting of (1) a copolymer of vinyl pyridine and a long-chain alkyl acrylate and (2) a copolymer of vinyl pyrrolidone and a long-chain alkyl acrylate said copolymers having a molecular weight range of from 100,000 to 1,000,000 and from about 0.1% to about 10% by weight of (B) an oil-soluble basic alkaline earth petroleum sulfonate-trialkylamine complex having the formula $(R)_3N \cdot HO\text{---}MO_3SX$ where the R's are alkyl radicals, one of which contains from 6 to 20 carbon atoms and the remaining R radicals having from 1 to 4 carbon atoms, X is the petroleum residue of the sulfonate compound and M is an alkaline earth metal, said basic alkaline earth petroleum sulfonate containing 180 to 800% of alkaline earth over that theoretically required to neutralize the petroleum sulfonic acid.

2. The composition of claim 1 wherein the oil is a mineral lubricating oil, the alkyl acrylate in each copolymer is a $C_{12-18}$ alkyl methacrylate and M is selected from the group consisting of Ca, Ba and Mg.

3. A mineral oil lubricating composition comprising a major amount of mineral lubricating oil and from about 1% to about 6% by weight of (A) an oil-soluble copolymer of 2-methyl-5-vinyl pyridine/lauryl methacrylate/stearyl methacrylate having a molecular weight of from 200,000 to 800,000 and (B) from about 0.5% to about 5% by weight of oil-soluble basic calcium petroleum sulfonate-dimethyloctadecylamine complex, said basic alkaline earth petroleum sulfonate containing 180 to 800% of alkaline earth over that theoretically required to neutralize the petroleum sulfonic acid.

4. A mineral oil lubricating composition comprising a major amount of mineral lubricating oil and from about 1% to about 6% by weight of (A) an oil-soluble copolymer of N-vinyl pyrrolidone/lauryl methacrylate and from about 0.5% to about 5% by weight of (B) oil-soluble basic calcium petroleum sulfonate - dimethyloctadecylamine complex, said basic alkaline earth petroleum sulfonate containing 180 to 800% of alkaline earth over that theoretically required to neutralize the petroleum sulfonic acid.

5. A mineral oil lubricating composition comprising a major amount of mineral lubricating oil and from about 1% to about 6% by weight of (A) an oil-soluble copolymer of 2 - methyl - 5 - vinyl pyridine/lauryl methacrylate/stearyl methacrylate having a molecular weight of from 200,000 to 800,000 from about 0.5% to about 5% by weight of (B) oil-soluble basic calcium petroleum sulfonate-dimethyloctadecylamine complex, said basic alkaline earth petroleum sulfonate containing 180 to 800% of alkaline earth over that theoretically required to neutralize the petroleum sulfonic acid and from about 0.2% to about 1% by weight of (C) oil-soluble metal dialkyl dithiophosphate.

6. A mineral oil lubricating composition comprising a major amount of mineral lubricating oil and from about 1% to about 6% by weight of (A) an oil-soluble copolymer of N-vinyl pyrrolidone/lauryl methacrylate, from about 0.5% to about 5% by weight of (B) oil-soluble basic calcium petroleum sulfonate-dimethyloctadecylamine complex, said basic alkaline earth petroleum sulfonate containing 180 to 800% of alkaline earth over that theoretically required to neutralize the petroleum sulfonic acid and from about 0.2% to about 1% by weight of (C) oil-soluble metal dialkyl dithiophosphate.

7. A mineral oil lubricating composition comprising a major amount of mineral lubricating oil and from about 1% to about 6% by weight each of (A) an oil-soluble copolymer of 2-methyl-5-vinyl pyridine/lauryl methylacrylate/stearyl methacrylate having a molecular weight of from 200,000 to 800,000, from about 0.5% to about 5% by weight of (B) oil-soluble basic calcium petroleum sulfonate-dimethyloctadecylamine complex, said basic alkaline earth petroleum sulfonate containing 180 to 800% of alkaline earth over that theoretically required to neutralize the petroleum sulfonic acid and from about 0.2% to about 1% by weight of (C) oil-soluble zinc dialkyl dithiophosphate.

8. A mineral oil lubricating composition comprising a major amount of mineral lubricating oil and from about 1% to about 6% by weight of (A) an oil-soluble copolymer of N-vinyl pyrrolidone/lauryl methacrylate, from about 0.5% to about 5% by weight of (B) oil-soluble basic calcium petroleum sulfonate-dimethyloctadecylamine complex, said basic alkaline earth petroleum sulfonate containing 180 to 800% of alkaline earth over that theoretically required to neutralize the petroleum sulfonic acid and from about 0.2% to about 1% by weight of (C) oil-soluble zinc dialkyl dithiophosphate.

9. A mineral oil lubricating composition comprising a major amount of mineral lubricating oil and from about 1% to about 6% by weight of (A) an oil-soluble copolymer of 2 - methyl - 5 - vinyl pyridine/lauryl methacrylate/stearyl methacrylate having a molecular weight of from 200,000 to 800,000, from about 0.5 to about 5% by weight of (B) oil-soluble basic barium petroleum sulfonate-dimethyloctadecylamine complex, said basic alkaline earth petroleum sulfonate containing 180 to 800% of alkaline earth over that theoretically required to neutralize the petroleum sulfonic acid and from about 0.2% to about 1% by weight of (C) oil-soluble zinc dialkyl dithiophosphate.

10. A mineral oil lubricating composition comprising a major amount of mineral lubricating oil and from about 1% to about 6% by weight of (A) an oil-soluble copolymer of N-vinyl pyrrolidone/lauryl methacrylate having a molecular weight of from 200,000 to 800,000, from about 0.5% to about 5% by weight of (B) oil-soluble basic barium petroleum sulfonate-dimethyloctadecylamine complex, said basic alkaline earth petroleum sulfonate containing 180 to 800% of alkaline earth over that theoretically required to neutralize the petroleum sulfonic acid and from about 0.2% to about 1% by weight of (C) oil-soluble zinc dialkyl dithiophosphate.

References Cited by the Examiner
UNITED STATES PATENTS

| | | | |
|---|---|---|---|
| 2,425,085 | 8/47 | Daque | 252—33.4 |
| 2,467,118 | 4/49 | Duncan et al. | 252—33 |
| 2,721,843 | 10/55 | Palmer | 252—33 |
| 2,958,660 | 11/60 | Edgar et al. | 252—33.4 |
| 2,976,238 | 3/61 | Elliott et al. | 252—32.5 |

DANIEL E. WYMAN, *Primary Examiner.*

JULIUS GREENWALD, *Examiner.*